US008720786B2

(12) United States Patent
Boge et al.

(10) Patent No.: US 8,720,786 B2
(45) Date of Patent: May 13, 2014

(54) CARD SECURITY ACTIVATION LABEL AND METHOD

(75) Inventors: Paul Boge, Mora, MN (US); John P. Dwyer, Oak Park Heights, MN (US); Stacy Michelle Jensen, Maple Grove, MN (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

(21) Appl. No.: 13/437,755

(22) Filed: Apr. 2, 2012

(65) Prior Publication Data

US 2012/0256003 A1     Oct. 11, 2012

Related U.S. Application Data

(60) Provisional application No. 61/471,004, filed on Apr. 1, 2011.

(51) Int. Cl.
| | |
|---|---|
| *G06K 19/02* | (2006.01) |
| *G06K 19/00* | (2006.01) |
| *G06F 17/00* | (2006.01) |
| *G06K 5/00* | (2006.01) |

(52) U.S. Cl.
USPC ............ 235/488; 235/375; 235/380; 235/487

(58) Field of Classification Search
USPC .......................... 235/375, 380, 486, 487, 488
See application file for complete search history.

(56) References Cited

U.S. PATENT DOCUMENTS

| | | | |
|---|---|---|---|
| 4,033,059 A | 7/1977 | Hutton et al. | |
| 4,250,999 A | 2/1981 | Milvik | |
| 4,591,190 A | 5/1986 | Clark | |
| 5,091,261 A | 2/1992 | Casey et al. | |
| 5,360,116 A | 11/1994 | Schmiletzky | |
| 5,398,867 A | 3/1995 | Murphy | |
| 5,427,832 A | 6/1995 | Longtin | |
| 5,760,381 A | 6/1998 | Stich et al. | |
| 5,777,305 A | 7/1998 | Smith et al. | |
| 5,918,909 A | 7/1999 | Fiala et al. | |
| 6,010,784 A | 1/2000 | Peterson | |
| 6,224,108 B1 | 5/2001 | Klure | |
| 6,270,012 B1 | 8/2001 | Dawson | |
| 6,315,206 B1 | 11/2001 | Hansen et al. | |

(Continued)

FOREIGN PATENT DOCUMENTS

| | | |
|---|---|---|
| EP | 1538554 A2 | 6/2005 |
| GB | 2354199 A | 3/2001 |

*Primary Examiner* — Christle I Marshall
*Assistant Examiner* — Claude J Brown
(74) *Attorney, Agent, or Firm* — Marsh Fischmann & Breyfogle LLP (57) ABSTRACT

Card security apparatus and methods are provided. An obstruction layer (e.g., a hot-stamped scratch off foil label) may be provided in at least partially overlapping relation to a data field of a card (e.g., including proprietary information unique to the specific card). The obstruction layer may render all or at least a portion of the card data field unreadable in the presentation position. All or at least a portion of an exposed data field, such e.g., as an activation field, may be disposed on an outer surface of the obstruction layer such that the activation field is readable with the obstruction layer in the presentation position. Displacement of the obstruction layer may render the exposed data field, e.g., activation field, unreadable (e.g., via destruction of all or at least a portion of the obstruction layer) and the data field readable.

28 Claims, 9 Drawing Sheets

(56) References Cited

U.S. PATENT DOCUMENTS

| | | |
|---|---|---|
| 6,328,341 B2 | 12/2001 | Klure |
| 6,439,613 B2 | 8/2002 | Klure |
| 6,454,165 B1 | 9/2002 | Dawson |
| 6,543,809 B1 | 4/2003 | Kistner et al. |
| 6,609,662 B2 | 8/2003 | Annacone et al. |
| 6,619,480 B2 | 9/2003 | Smith |
| 6,715,795 B2 | 4/2004 | Klure |
| 6,729,656 B2 | 5/2004 | Kubert et al. |
| 6,957,737 B1 | 10/2005 | Frederickson et al. |
| 7,000,844 B1 | 2/2006 | Smith |
| 7,267,284 B1 | 9/2007 | Smith |
| 7,740,170 B2 | 6/2010 | Singh et al. |
| 2003/0004889 A1 | 1/2003 | Fiala et al. |
| 2005/0071233 A1 | 3/2005 | Nemeth et al. |
| 2005/0091115 A1 | 4/2005 | Arthur |
| 2006/0201103 A1 | 9/2006 | Tokarski et al. |
| 2006/0261154 A1 | 11/2006 | Arthur et al. |
| 2007/0063052 A1 | 3/2007 | Chakiris et al. |
| 2007/0262160 A1 | 11/2007 | Narlinger et al. |
| 2007/0278296 A1 | 12/2007 | Dwyre et al. |
| 2008/0110972 A1* | 5/2008 | Grossman et al. ............ 235/375 |
| 2008/0191460 A1 | 8/2008 | Blank |
| 2008/0197621 A1 | 8/2008 | Grotkowski et al. |
| 2009/0078590 A1 | 3/2009 | Smith |
| 2009/0099964 A1 | 4/2009 | Calderon Gonzalez |
| 2009/0254484 A1 | 10/2009 | Forero et al. |
| 2010/0219099 A1 | 9/2010 | Schmitt et al. |

* cited by examiner

CARD SECURITY ACTIVATION LABEL AND METHOD

RELATED APPLICATIONS

This application claims priority to U.S. Provisional Patent Application No. 61/471,004 filed Apr. 1, 2011, entitled "CARD SECURITY ACTIVATION LABEL AND METHOD," which application is incorporated herein by reference in its entirety.

FIELD OF THE INVENTION

The present invention relates to presentation instruments for activatable cards, and more particularly, to presentation instruments having card security labels employable for enhanced functionality, including, e.g., activation.

BACKGROUND OF THE INVENTION

The sale of debit cards, gift cards, telephone cards and other transaction cards at retail locations is widespread and increasing. Typically, such transaction cards are packaged, distributed and displayed at point-of-sale (POS) locations in an inactive state. In turn, in conjunction with a purchase transaction, a corresponding transaction card is activated at a POS location. Typically, activation entails reading a machine-readable card activation marking on the transaction card and/or packaging therefor (collectively a card presentation instrument), correlating the read data with an account having a balance of funds (e.g., a predetermined balance or a replenishable balance) that corresponds with the card, and activating the account card for use.

Unfortunately, third-party tampering with card presentation instruments has presented continuing design challenges. For example, in one tampering scheme third-parties have modified card activation markings on packaging so that, upon purchase of a modified package, an unintended card account (e.g., an account that is accessible by the third-party) is activated. In another tampering scheme, third-parties obtain proprietary account data from transaction cards at a POS location, which proprietary account data may then be fraudulently employed after purchase and activation of the cards to access account funds corresponding with the transaction cards. As a result of such tampering schemes, various approaches have been proposed to enhance card presentation instruments and reduce incidents of tampering.

Figure 1:
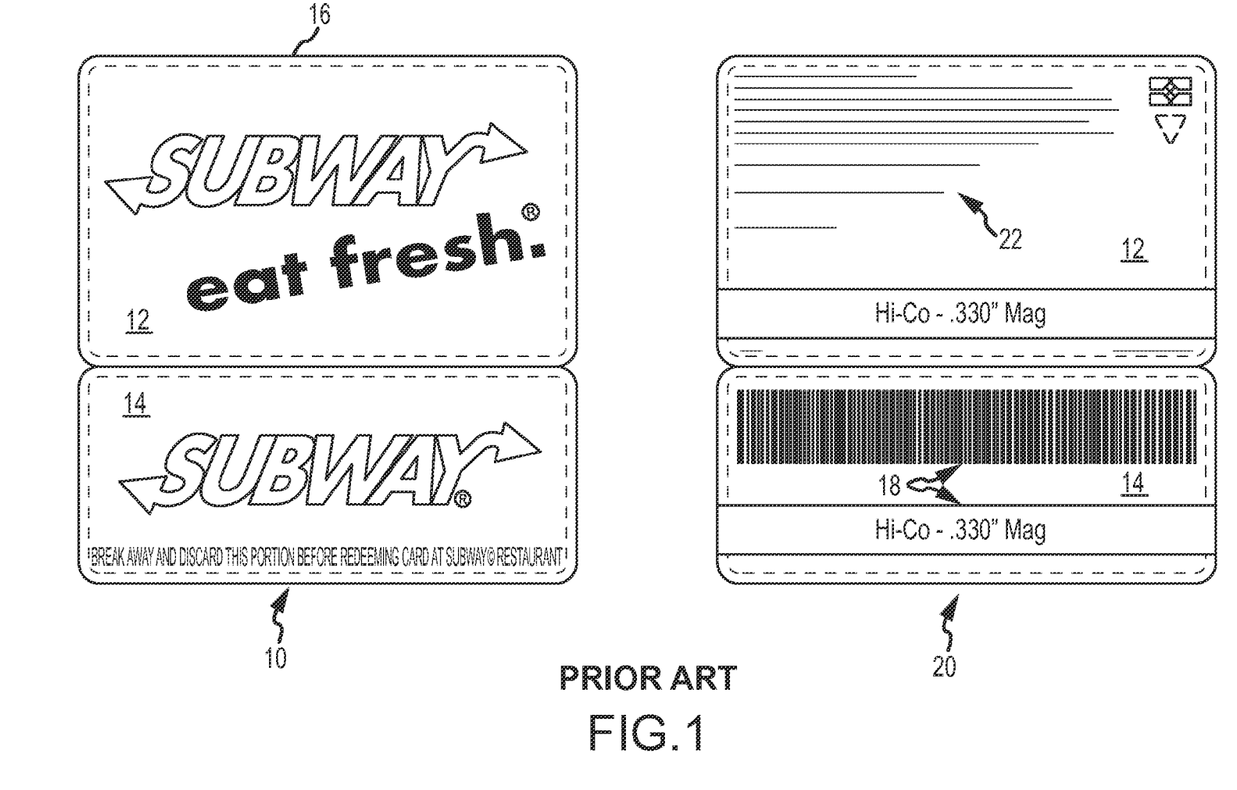
FIG. 1 depicts a prior art card presentation instrument.

One example of a prior art card presentation instrument is shown in FIG. 1. FIG. 1 depicts the front 10 and back 20 of a prior art card presentation instrument. The card presentation instrument may include a card portion 12 and a dedicated activation portion 14 connected to a surround portion 16. The card portion 12 may include card indicia 22 including a card number and/or PIN number associated with proprietary account data, for example. At least a portion of the card indicia 22 may be obscured when the card presentation instrument is displayed for sale (e.g., covered with a portion of packaging or a scratch off type covering). Other card indicia may be provided that is uniquely associated with the card 12. The dedicated activation portion 14 includes activation indicia 18. For instance, the activation indicia 18 may include a bar code or magnetic stripe that encodes activation information used to activate the card 12. In the depicted prior art card presentation instrument, the activation indicia 18 on the dedicated activation portion 14 may be used to activate the card 12. That is, an account that corresponds to the card 12 and includes a balance of funds may be associated with the card 12 during activation. Subsequent to activation, the card portion 12 may be separated from the dedicated activation portion 14 and surround portion 16. The card 12 may thereafter be used as a transaction card for value in the amount of the balance of funds of the corresponding account associated with the card 12. Correspondingly, after activation of the card 12, the activation portion 14 and surround 16 are typically disposed of as waste product.

SUMMARY OF THE INVENTION

In view of the foregoing, an objective of the present invention is to provide an improved card presentation instrument with improved anti-fraud and anti-tampering features, particularly for cards sold at a point-of-sale (POS). A related objective is to provide an improved card presentation instrument for enhancing POS presentation opportunities. A further objective is to provide an improved, environmentally conscious, card presentation instrument. Another objective is to provide an improved card presentation instrument satisfying one or more of the above identified objectives in a user-friendly and/or cost-effective manner.

In addressing one or more of these objectives, it is recognized that the card presentation instrument of FIG. 1 includes a dedicated activation portion 14 used only for activation that occupies space that could otherwise be used at the POS for other display content (e.g., for additional card presentation instruments or the like). The card presentation instrument of FIG. 1 also requires substantial material and attendant cost to produce the dedicated activation portion 14. Additionally, the material used for the dedicated activation portion 14 contributes to the overall environmental impact of the card presentation instrument.

In relation to the foregoing, improved card presentation instruments are provided. In particular, a card presentation instrument may include an activatable card having a card data field disposed on a first side thereof. The card data field may be uniquely associated with the activatable card. For example, the card date field may comprise or otherwise correspond to a card number, a PIN number or other data uniquely associated with a proprietary account (e.g., a pre-paid, debit, or credit account maintained by a card issuer). Additionally, an obstruction layer may be located in a presentation position relative to the activatable card such that all or at least a portion of the card data field is rendered unreadable.

The obstruction layer may include all or at least a portion of an exposed data field disposed on an outer surface thereof. The exposed data field may comprise data employable to realize a predetermined functionality associated with the activatable card. For example, the exposed data field may comprise an activation field that is readable when the obstruction layer is in the presentation position to activate the activatable card (e.g., a machine readable marking, such as a bar code, readable at a check-out register at a POS location to effect card activation via automated interface with a host computer of a card issuer).

Various additional features may be provided. In one aspect, the obstruction layer may be provided so that, upon displacement of the obstruction layer, the exposed data field (e.g., an activation field) is rendered unreadable. For example, the obstruction layer may be constructed so that its displacement effectively precludes the readability of the exposed data field. In another aspect, the obstruction layer may be located so that the exposed data field (e.g., activation field) is located in at least partially overlapping to the card data field the obstruction layer is when in the presentation position. In yet another aspect, the exposed data field may be provided so that a first portion thereof is disposed on the obstruction layer and a second portion thereof is disposed on the activatable card, wherein the second portion remains on the activatable card after displacement of the obstruction layer.

In a further aspect, a plurality of exposed data fields may be provided, with at least a portion of each of the exposed data fields disposed on the outside surface of the obstruction layer. For example, a first exposed data field may comprise an activation field readable to activate the activatable card, and a second exposed data field may comprise data readable for use in realizing additional functionality. For example, the second exposed data field may comprise a machine readable marking such as a one-dimensional bar code or a two-dimensional barcode (e.g., a QR code readable by a camera phone for use in transferring account-related data between the activatable card and the camera phone and/or for use in conjunction with internet communications relating to account-related use of the activatable card and/or camera phone as a transaction instrument).

Improved methods associated with an activatable card also are provided. The methods may include presenting at a point-of-sale (POS) location an activatable card having an obstruction layer located in a presentation position relative to the activatable card to render unreadable a card data field that is uniquely associated with the activatable card. The obstruction layer has disposed thereon at least a portion of an exposed data field that is readable when in the presentation position (e.g., a machine-readable marking). The method may further include reading the exposed data field at the POS with the obstruction layer in the presentation position (e.g., at a POS check-out register).

In one aspect, the method may also include locating the obstruction layer in at least partially overlapping relation to said card data field when in said presentation position. Another aspect may include providing a card presentation instrument so that the obstruction layer is displaceable from the presentation position to render the card data field readable and the exposed data field unreadable (e.g., due to destruction of at least a portion of the obstruction layer attendant to the displacement thereof).

In a further aspect, a plurality of exposed data fields may be provided, with at least a portion of each of the exposed data fields disposed on the obstruction layer and separately employed to realize different functionalities associated with the activatable card and/or proprietary account corresponding therewith. For example, a first exposed data field may comprise a machine-readable marking for card activation and a second exposed data field may comprise a machine-readable marking for use in account management.

A number of feature refinements and additional features are applicable to the foregoing aspects of the present invention. These feature refinements and additional features may be used individually or in any combination. As such, each of the following features that will be discussed may be, but are not required to be, used with any other foregoing feature or combination of features.

In one approach, the obstruction layer is disposed in direct contact with the activatable card when in the presentation position. For example, the obstruction layer may comprise a hot-stamped foil label applied to the activatable card. The hot-stamped foil label may include a frangible, or destructible layer (e.g., scratch-off, rippable, etc.) layer on which the exposed data field, e.g., an activation field, is disposed. The frangible or destructible layer may be provided over a base layer (e.g., a transparent, copolymer, heat-activated adhesive). Accordingly, displacement of the obstruction layer may include detaching a portion of or the entirety of the obstruction layer from the activatable card. This may involve abrading at least a portion of the obstruction layer. The abrading may destroy the frangible or destructible layer, leaving all or a portion of the adherent base layer intact such that the card (e.g., a card data field) is readable once the obstruction layer is displaced.

In various embodiments, the exposed data field (e.g., an activation field) may be machine readable when in the presentation position. Displacement of the obstruction layer from said presentation position may in turn render the exposed data field non-machine readable. For instance, when a hot-stamped foil label is scratched-off, ripped, or otherwise removed from the activatable card, the machine readability of the activation field may be destroyed. In certain embodiments, an activation field may include a bar code (e.g., a one dimensional or two dimensional bar code), a holograph, or other machine readable marking. As such, in various approaches, the activation field may be read from the activatable card (e.g., at a POS). In response to reading the activatable field, the activatable card may be activated. For instance, the activating step may include automatically transmitting data corresponding to the activation field to a host computer associated with a card issuer. In this regard, the data field may include a proprietary account data field established by the card issuer and maintained at the host computer.

In some implementations, the card presentation instrument may include a support member that encloses at least a portion of the activatable card. The support member may include an aperture that is aligned with the exposed data field (e.g., activation field) when said obstruction layer is in said presentation position. Accordingly, the support member and/or aperture may allow an activation field to remain readable, while providing protection to the obstruction layer to prevent unintended destruction of the activation field prior to activation. As such, the durability of the activatable card may be enhanced to help facilitate manufacturing and/or distribution such that the obstruction layer is not inadvertently destroyed. To further facilitate the durability of the card presentation instrument, the aperture may include a substantially transparent, protective layer located adjacent to the obstruction layer when in the presentation position. This may further reduce the potential for unintended destruction of the obstruction layer prior to activation.

Numerous additional features and advantages of the present invention will become apparent to those skilled in the art upon consideration of the embodiment descriptions provided hereinbelow.

DETAILED DESCRIPTION

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 2A:
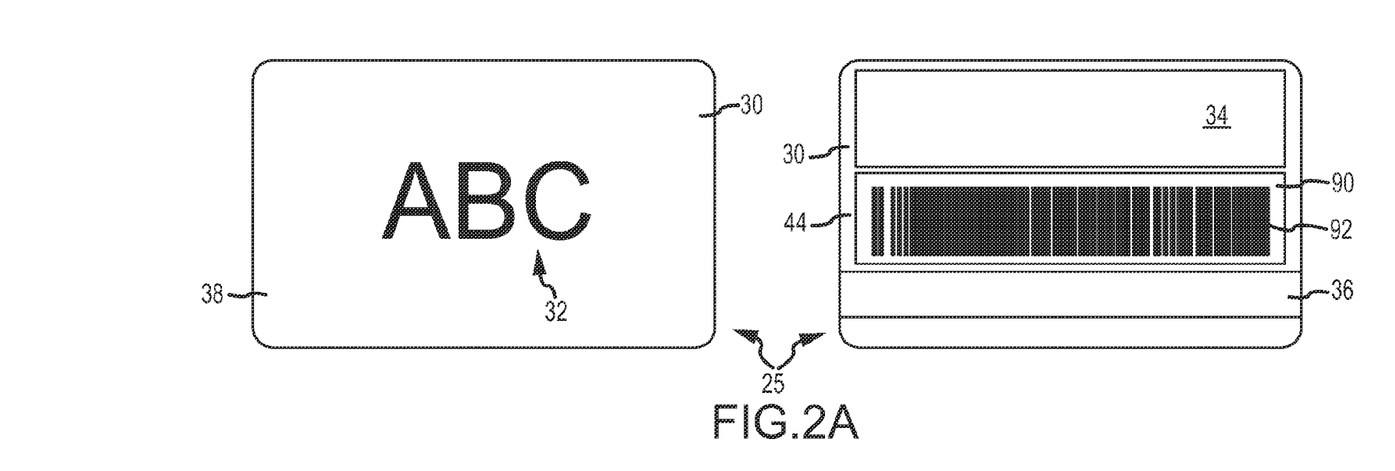
FIGS. 2A-2C depict an embodiment of a card presentation instrument in different states corresponding to changes in an obstruction layer.
Figure 2B:
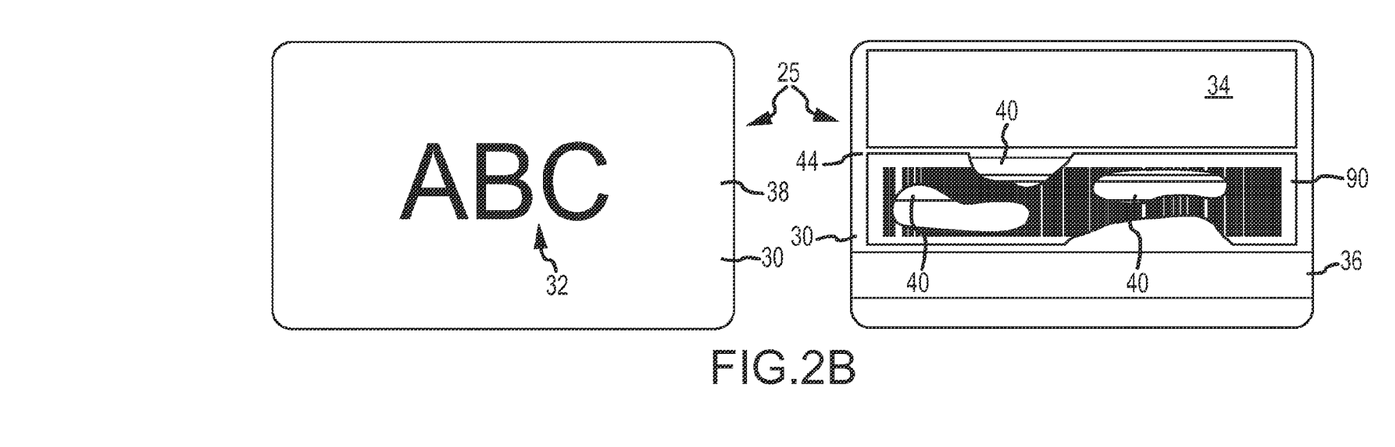
Figure 2C:
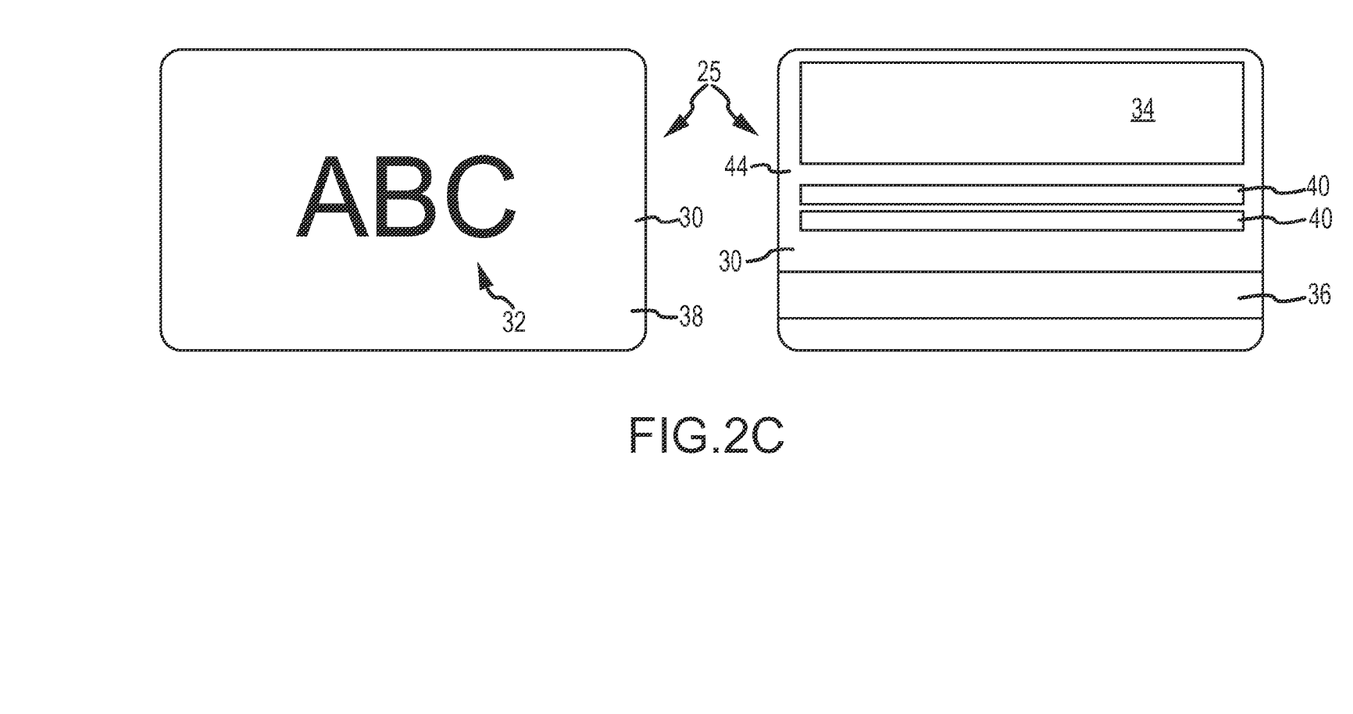

FIGS. 2A-2C illustrate an embodiment of a card presentation instrument 25. The card presentation instrument includes an activatable card 30 and an obstruction layer 90.

In FIGS. 2A-2C, the front 38 of the activatable card 30 is shown on the left side of the figures and the rear 44 of the activatable card 30 is shown on the right side of the figures. The front 38 of the activatable card 30 may include merchant indicia 32, text, graphics, or the like. The merchant indicia 32 may, for example, indicate one or more merchants that will accept the activatable card 30 once activated.

The activatable card 30 may also contain a graphics portion 34 on a rear 44 side thereof. The graphics portion 34 may include terms and conditions associated with the activatable card 30, other legal language, additional merchant information, or other information related to the card 30. The rear of the activatable card 30 may also include a magnetic stripe 36 which may include machine readable information comprising one or more magnetic tracks encoded onto the magnetic stripe 36. For example, the magnetic stripe 36 may be encoded with a card number such that the magnetic stripe 36 may be read at a POS during a transaction after the card has been activated. The magnetic stripe 36 may be disposed on the activatable card 30 in accordance with International Organization for Standardization (ISO) standards associated with transaction cards or the like.

As shown in FIG. 2C, the activatable card 30 may include one or more data field(s) 40 disposed on the rear 44 of the card 30. The data field(s) 40 may include data unique to the particular activatable card 30. In this regard, data field(s) 40 may include a card number, personal identification number (PIN), or other indicia uniquely identifying or associated with the particular activatable card 30. The data field(s) 40 may be disposed (e.g., printed, stamped, embossed, etc.) directly onto the activatable card 30. In at least certain transactions, information from the data fields 40 may be required to be read in order to complete the transaction. In one embodiment, the data field(s) 40 include proprietary account data necessary to use the activatable card 30 for value.

The card presentation instrument 25 may also include an obstruction layer 90. As shown in FIG. 2A, the obstruction layer 90 may be located in overlapping relation to the activatable card 30. The obstruction layer 90 may be disposed in adherent contact with the activatable card 30. The obstruction layer 90 may generally be located with respect to the data field(s) 40 such that the obstruction layer 90 is located in at least partial overlapping relation to the data field(s) 40. In this regard, all or at least a portion of the data field(s) 40 may be rendered unreadable when the obstruction layer 90 is in a location as shown in FIG. 2A. This location of the obstruction layer 90 may be referred to as a presentation position.

Note that the obstruction layer 90 is located in spaced relation with respect to the magnetic stripe 36 such that operation of the magnetic stripe 36 is unaffected by the obstruction layer 90. The obstruction layer 90, while not depicted as such, may also cover at least a portion of the graphics portion 34.

The obstruction layer 90 may include an adherent base layer. Disposed over the base layer may be a substantially opaque layer (e.g., a metal-based layer) which prevents that which underlies the obstruction layer 90 from being viewed or read. The obstruction layer 90 may be provided in the form of a hot-stamp foil label.

The obstruction layer 90 may additionally include all or at least a portion of an exposed data field 92 disposed on an outer surface of the obstruction layer 90. In the illustrated embodiment, the entirety of exposed data field 92 is disposed on the obstruction layer 90, and the exposed data field 92 comprises an activation field readable to activate the card 30 at a POS location. The activation field 92 may be disposed (e.g., printed, stamped, etc.) on the obstruction layer 90 after the obstruction layer 90 has been located in the presentation position or may be preprinted such that the activation field 92 appears on the obstruction layer 90 prior to locating the obstruction layer 90 in the presentation position.

In any regard, the activation field 92 may be readable when the obstruction layer 90 is in the presentation position shown in FIG. 2A. The activation field 92 may be a machine readable representation of activation data that may be used to activate the activatable card 30. As depicted in FIG. 2A, the activation field 92 may include a bar code. While a one dimensional bar code is depicted in FIG. 2A, other machine readable formats may be employed such as, for example, a two dimensional bar code (e.g., a QR code), a holograph, or the like. Further, while not shown in FIG. 2A, multiple exposed data fields may be provided on the outer surface of obstruction layer 90. The multiple exposed data fields may be provided to enhance interface functionality with other devices, including e.g., camera cell phones.

At least a portion of the obstruction layer 90 may be displaceable from the presentation position shown in FIG. 2A. For example, the opaque layer overlying the clear base layer may be removed, displaced or destroyed to reveal data field(s) 40. In one embodiment, at least a portion of the obstruction layer 90 may be abraded (e.g., scratched, ripped, or otherwise removed) such that the obstruction layer 90 is displaced from the presentation position. The displacement of the obstruction layer 90 in this manner may result in the destruction, or obfuscation, of the exposed data field 92. This may result in the exposed data field 92 becoming unreadable.

For example, as shown in FIG. 2B, the obstruction layer 90 has been partially displaced (e.g., scratched away) from the activatable card 30. In turn, portions of the machine-readable encoding of an activation field 92 have been removed, thus rendering the activation field 92 unreadable. The displacement and/or destruction of the obstruction layer 90 may continue until, as shown in FIG. 2C, the obstruction layer 90 may be totally removed from the activatable card 30.

In addition to rendering the activation field 92 unreadable, displacement of the obstruction layer 90 may also render the data field(s) 40 disposed on the activatable card 30 readable. As shown in FIG. 2B, as the portions of the obstruction layer 90 are displaced, portions of the data field(s) 40 may begin to be seen. However, the data field(s) 40 may not be fully visible or readable until substantially the entire obstruction layer 90 is removed from the presentation position (e.g., the condition shown in FIG. 2C).

If the obstruction layer 90 is displaced in a wrongful attempt to read the data field(s) 40, and the activatable card 30 has yet to be activated, activation is prevented as the activation field 92 is rendered unreadable. Accordingly, any attempt to read the data field(s) 40 prior to activation (e.g., in a theft or fraud scheme) may result in the activation field 92 becoming unreadable such that the activatable card cannot be activated. In turn, the embodiment of an activatable card 30 as shown in FIGS. 2A-2C may facilitate fraud reduction associated with activatable cards.

Figure 4:
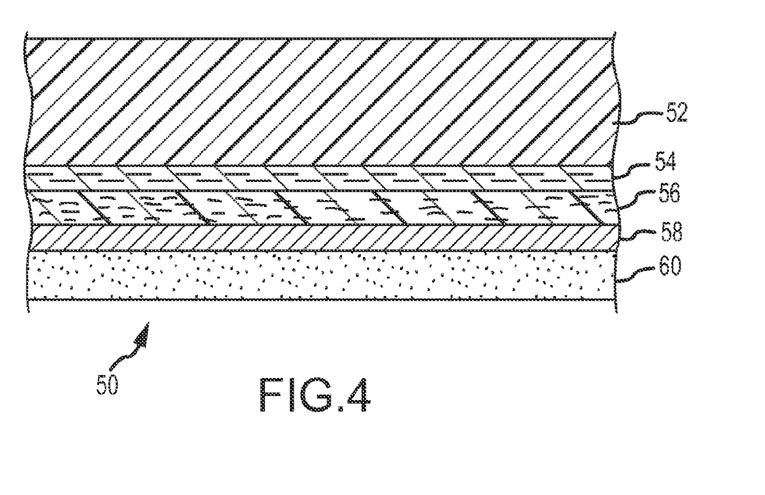
FIG. 4 depicts a cross section of an embodiment of an obstruction layer.

As mentioned above, the obstruction layer 90 may include a hot-stamped foil label. The structure of an embodiment of a foil label 50 that may comprise the obstruction layer 90 is illustrated in FIG. 4. FIG. 4 shows a foil label 50 comprising a polyester carrier layer 52 (e.g., approximately 12 microns thick) carrying a wax-based release layer 54 (e.g., approximately 0.01 micron thick). To the underside of the release layer 54 there may be applied in sequence a lacquer layer 56 (e.g., approximately 1 micron thick), a metallic layer 58 (e.g., approximately 0.01 micron thick), and finally a layer 60 of adhesive (e.g., approximately 1.5 microns thick). With reference to the embodiment described with respect to FIGS. 2A-2C above, the adhesive layer 60 may correspond to the base layer. Also, the metallic layer 58 may correspond to the opaque layer.

In one embodiment, the adhesive 60 may be a heat activated adhesive that is activated during a hot-stamping process. Furthermore, the adhesive 60 may be a copolymer-adhesive such as polypropylene. The adhesive 60 may be substantially transparent (e.g., such that data field(s) 40 is readable therethrough) when applied to the activatable card 30. The metallic layer 58 may be substantially opaque such that the metallic layer 58 renders the data field(s) 40 unreadable when in the presentation position. Accordingly, the metallic layer 58 may be displaced (e.g., abraded) and may be separated (e.g., at a release layer (not shown) between the metallic layer 58 and adhesive 60) to reveal the transparent adhesive 60. In turn, one or more data field(s) 40 may be rendered readable through the adhesive 60 upon displacement of the metallic layer 58. As the metallic layer 58 may flake, tear, or be destroyed upon abrasion (e.g., scratching) of the metallic layer 58, an activation field 92 or portion thereof disposed thereon may also be destroyed such that the activation field 92 is no longer readable. The activation field 92 or portion thereof may be disposed (e.g., printed, stamped, etc.) on the foil label 50 after the foil label 50 is applied to the activatable card 30 or activation field 92 may be printed on the foil label 50 prior to application of the foil label 50 to the activatable card.

Additional anti-fraud or authentication measures may be used in conjunction with the obstruction layer 90. For instance, additional indicia of authenticity may be provided on or by the obstruction layer 90. In one embodiment, the obstruction layer 90 may include one or more holograms such that the holograms are destroyed upon displacement of the obstruction layer 90. Such additional indicia of authentication may make it difficult for counterfeit or replica obstruction layers 90 to be refitted to a card once the original obstruction layer 90 is displaced or destroyed. Additionally or alternatively, anti-tampering mechanism may be employed. For instance, reactive materials may be used to indicate if the obstruction layer 90 is touched, tampered with, or otherwise manipulated prior to activation.

Figure 3A:
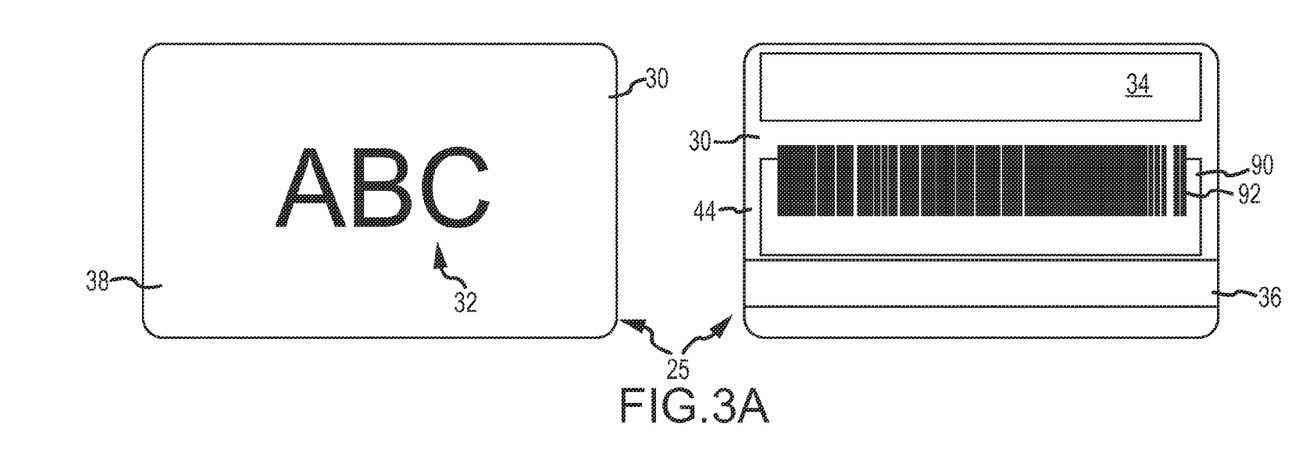
FIGS. 3A-3C depict an embodiment of a card presentation instrument in different states corresponding to changes in an obstruction layer.
Figure 3B:
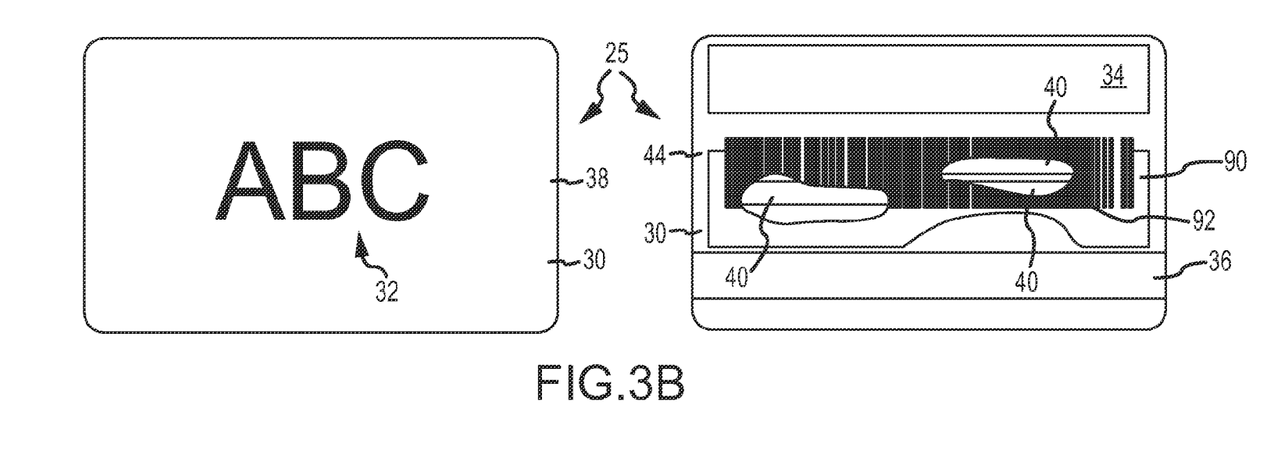
Figure 3C:
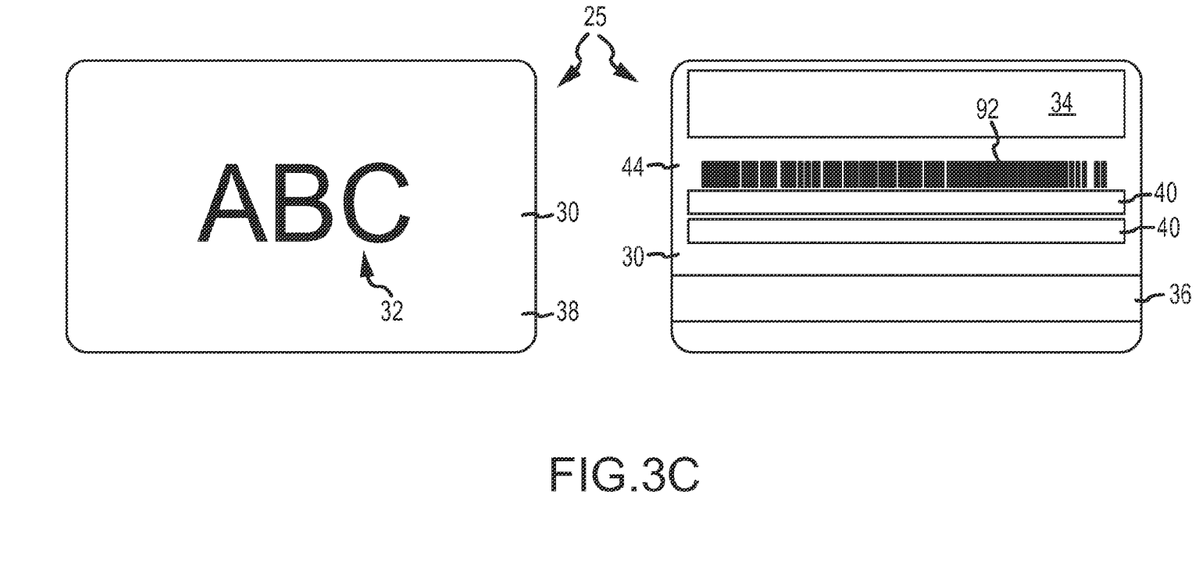

In the embodiment shown in FIGS. 3A-3C, the card presentation instrument 25 of the embodiment described above in relation to FIGS. 2A-2C is modified so that exposed data field 92 is provided with a portion thereof located on the obstruction layer 90 and another portion thereof disposed on the activatable card 30. For example as shown in FIG. 3A, exposed activation data field 92 may be disposed (e.g., printed, stamped, etc., in a contemporaneous operation) on the obstruction layer 90 and activatable card 30 after the obstruction layer 90 has been located in the presentation position. As shown in FIG. 3B, upon displacement of the obstruction layer 90, exposed activation data field 92 is rendered unreadable. As shown in FIG. 3C, upon removal of all or substantially all of the obstruction layer 90, a portion of the exposed activation data field 92 remains on the activatable card 30. As may be appreciated, such an approach reduces any risk of wrongful removal/replacement of obstruction layer 90 and subsequent activation of corresponding activatable card 30. That is, any attempt to replace a removed obstruction layer 90 in a manner that would yield a readable exposed activation data field 92 is frustrated (i.e., due to sizing, positioning, and other similar "matching-up" considerations).

Figures 5A, 5B:
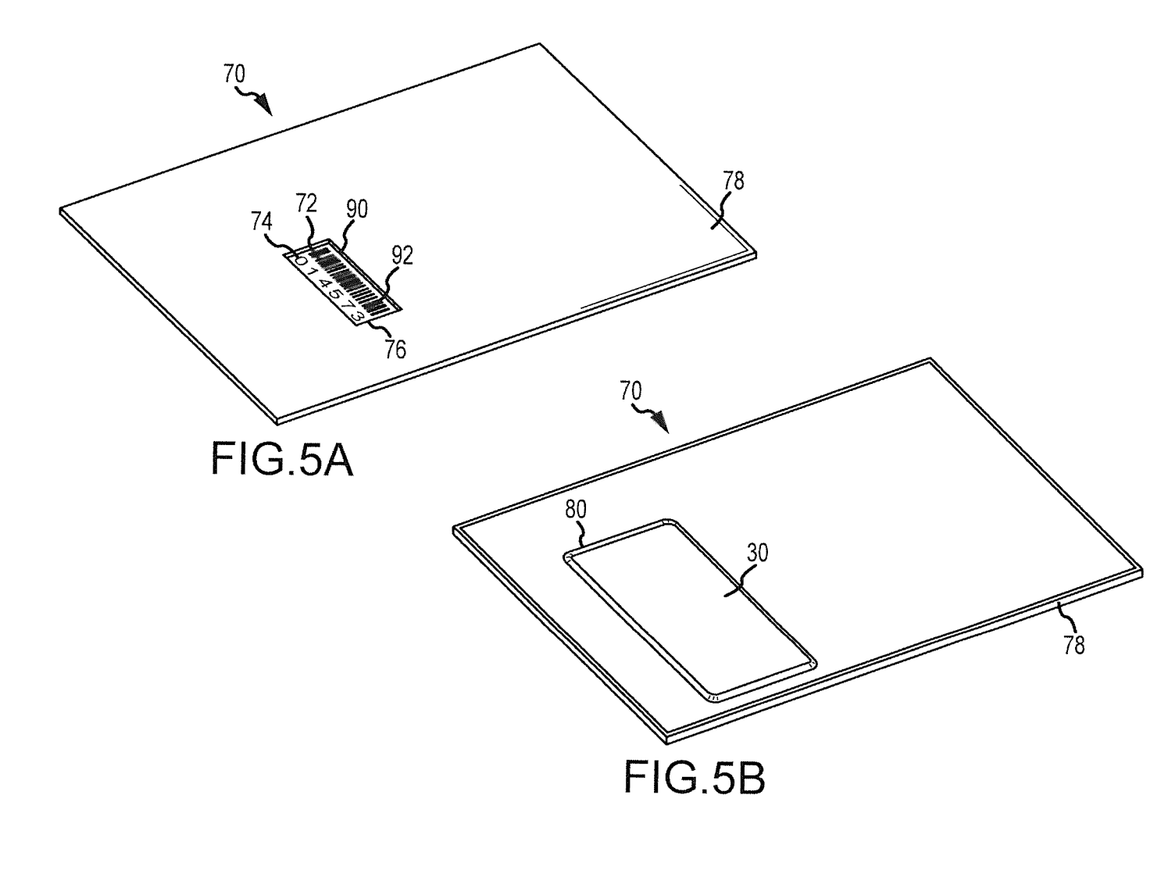
FIGS. 5A-5B depict an embodiment of a card presentation instrument including a support member enclosing at least a portion of an activatable card.

In another embodiment, a card presentation instrument 70 may additionally include a support member 78. FIGS. 5A and 5B depict a card presentation instrument 70 that includes an activatable card 30, an obstruction layer 90, and a support member 78. The front and back of an embodiment of a card presentation instrument 70 are depicted in FIGS. 5A and 5B, respectively.

The activatable card 30 may be at least partially enclosed by the support member 78 such that the card 30 is located in an enclosure 80. The support member 78 may include sheet material (e.g., card stock, paper stock, or other appropriate sheet material). The support member 78 may include a plurality of portions that are peripherally bonded together (e.g., via a heat-activated adhesive) to form an enclosure 80 for receiving the card 30. The support member 78 may include a single sheet of material that is folded to form one side of the enclosure 80 for receiving the card 30.

The support member 78 may include an aperture 76 extending therethrough. The card 30 may be positioned relative to the aperture 76 in the enclosure 80 such that an obstruction layer 90 is located adjacent to the aperture 76. Accordingly, an exposed data field 92, such as an activation field, may be readable through the aperture 76 when the card 30 is enclosed within the enclosure 80. For instance, the aperture 76 may allow the activation field 92 to be read by a bar code reader or the like at a POS purchase location. In this regard, the activation field 92 may include a machine readable field 72 (e.g., a bar code) and a human readable portion 74.

The support member 78 may help to prevent unintended displacement of the obstruction layer 90 during the course of manufacturing and distribution. As the obstruction layer 90 may be offset from the outer surface of the support member 78, contact to the card presentation instrument 70 may be isolated from direct contact with the obstruction layer 90. However, the aperture 76 may still allow the exposed data field 92 to be readable when the activatable card 30 is enclosed in the enclosure 80. As a further measure of protection from unintended displacement of the obstruction layer 90, a transparent layer (e.g., a clear film, plastic sheet, or the like) may be provided across the aperture 76. In this regard, the aperture 76 and transparent layer (not shown) may coordinate to protect the obstruction layer 90 from unintentional displacement, while maintaining the readability of the exposed data field 92. The support member 78 may include additional anti-theft and/or anti-tampering features such as tamper evident closures or the like.

Figure 6:
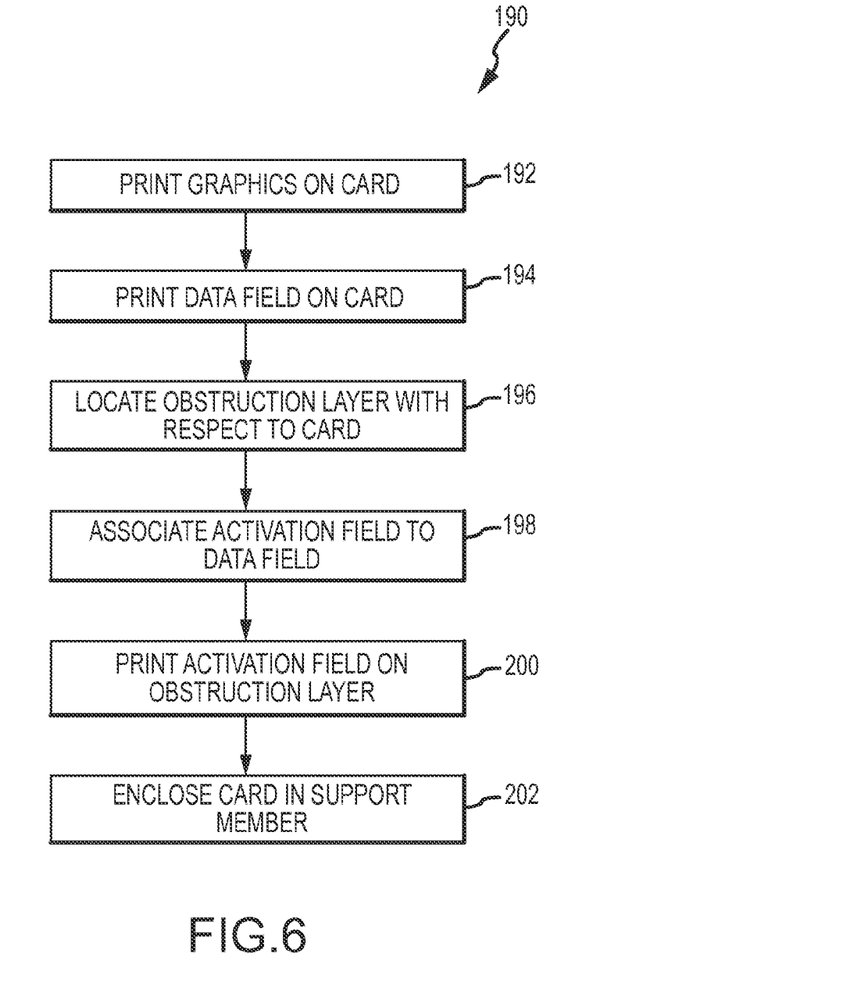
FIG. 6 depicts an embodiment of a flow chart for providing an activatable card.

Turning to FIG. 6, an embodiment of a process 190 for providing a card presentation instrument is shown. The process 190 may include printing 192 graphics onto the card. The printing 192 may include application of text and/or graphics (e.g., associated with a merchant issuing the card, another card issuer, or the like) in any manner known in the art. The process 190 may additionally include printing 194 one or more data field(s) onto the card. As discussed above, the data field(s) may include a card number, PIN, or other indicia uniquely associated with a particular card. Information associated with the data field may be used to correlate the card to an activation request as will be discussed in greater detail below with respect to FIG. 7.

The process 190 may also include locating 196 an obstruction layer with respect to the card. The locating 196 may include disposing onto the card the obstruction layer or otherwise positioning the obstruction layer such that the obstruction layer is in at least partial overlapping relation with the data field(s). The locating 196 may include hot-stamping a scratch off type foil label onto the card. As such, the foil label (e.g., such as that described above with respect to FIG. 4) may be contacted to the card with heat and pressure to activate adhesive to adhere the obstruction layer to the card.

An exposed data field, such as an activation field (e.g., a bar code or other machine readable indicia encoding activation information), may be associated 198 with the data field on the card. For example, an activation code may be associated 198 with a particular card number and PIN. All or at least a portion of an exposed activation data field may be disposed on the obstruction layer, e.g., at the time that a magnetic stripe is encoded and/or data fields are printed 194 on the card to ensure the activation code and card specific information (e.g., a card number, PIN, etc.) are properly correlated. The activation data field may be used in the activation process described in greater detail below in FIG. 7.

In any regard, all or at least a portion of the exposed data field (e.g., activation field) may be printed 200 onto the obstruction layer. In one approach the entirety of the activation data field is printed 200 on the obstruction layer. In another approach, a first and second portion of the activation data are contemporaneously provided (e.g., in the same operation) on the obstruction layer and activatable card, respectively. Alternatively, as discussed above, an obstruction layer may come preprinted with an activation field such that the printing 200 may be omitted. In an embodiment, a preprinted activation field may be associated with the information in the data field to ensure proper correlation between the activation information encoded in the activation field and a particular activatable card. The card may be at least partially enclosed 202 in a support member (e.g., such as was described with respect to FIGS. 5A and 5B).

Figure 7:
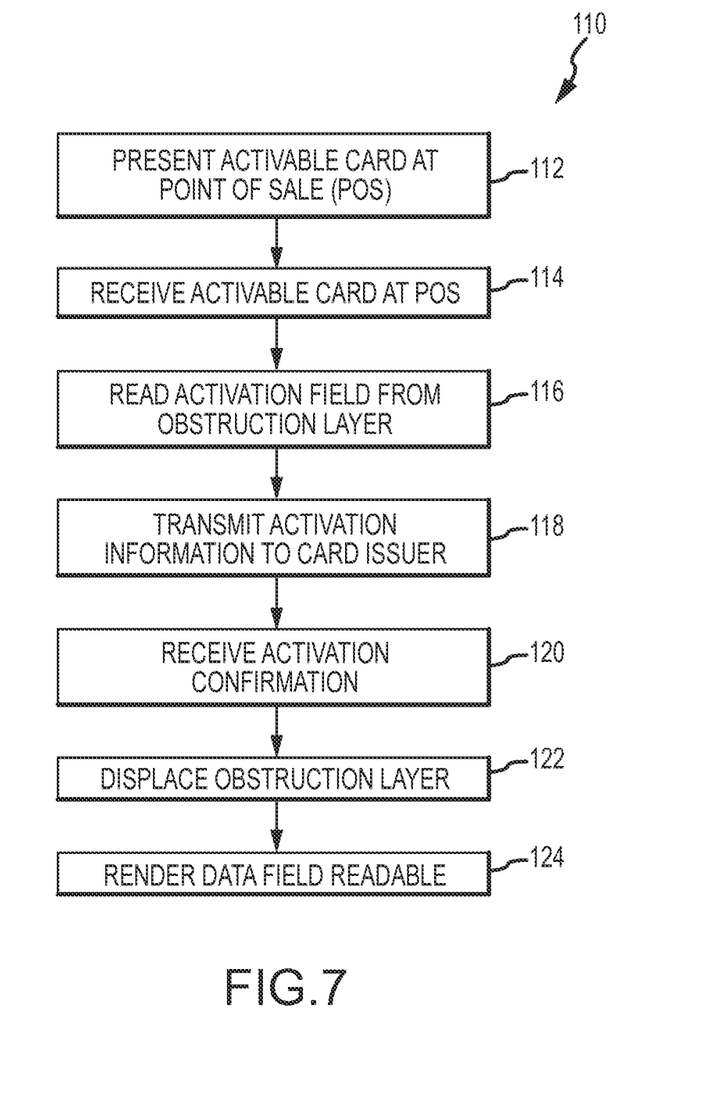
FIG. 7 depicts an embodiment of a flow chart for activating an activatable card.

FIG. 7 depicts a protocol 110 for presenting a card presentation instrument (e.g., at a POS). The protocol 110 may include presenting 112 an activatable card at a point-of-sale (POS). For example, a third party retailer may stock activatable cards associated with one or more merchants for purchase by consumers. A consumer may select an activatable card associated with a merchant and present the activatable card at a POS for activation. Accordingly, the activatable card may be received 114 at the POS. Once received 114, an activation field may be read 116 (e.g., by a bar code reader, hologram reader, or other type of machine reading technology) to obtain encoded activation information. In one embodiment, the activation field may be read 116 using a digital camera or the like. Accordingly, a digital camera may digitize an image of the activation field. The digitized image may be processed locally or remotely (e.g., via the Internet) to decode the activation field. As such, the card may be activated at a traditional POS (e.g., a register having a bar code reader) or may be activated, for example, by a hand held device including a digital camera.

In any regard, it will be understood that if the activatable card has been tampered with (e.g., the obstruction layer has been displaced in an attempt to obtain information from a data field), the activation field may not be readable such that the reading 116 may not be possible.

In the event that the activation field is readable, activation information obtained during the reading 116 may be transmitted 118 to a card issuer. The card issuer may correlate the activation information with an account corresponding to the information in the data field to activate the card. For example, a predetermined balance may be associated with the account or the consumer may manage the balance that is to be applied to the account (e.g., via on-line fund transfer facilities). After activation, the card may be used as a transaction card for value. Alternatively, the activation information may be processed locally to activate the card. If successfully activated, an activation confirmation may be received 120 at the POS. Once activated, the obstruction layer 122 may be displaced 122 to render 124 the data field readable. For at least some transactions, information contained in the data field may be needed in order to use the card in a transaction (e.g., in the case of online transactions, telephone transactions, etc.). Accordingly, the displacement of the obstruction layer may render the data field readable such that the card may be used in such a transaction.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A card presentation instrument having an exposed data field associated with an activatable transaction card, comprising:

an activatable transaction card having a card data field disposed on a first side thereof, said card data field being uniquely associated with said activatable card and comprising a proprietary account data field associated with an account corresponding to the activatable transaction card; and an obstruction layer located in a presentation position relative to said activatable card to render at least a portion of said card data field unreadable, said obstruction layer having at least a portion of said exposed data field disposed on an outer surface thereof, said exposed data field being readable for activation of said activatable card when the obstruction layer is in said presentation position, wherein said obstruction layer is displaceable from said presentation position to render said card data field readable and to render said exposed data field unreadable.

2. A card presentation instrument according to claim 1, wherein said obstruction layer is disposed in contact with said activatable card in said presentation position.

3. A card presentation instrument according to claim 2, wherein said exposed data field comprises a machine readable activation field for activation of said activatable card when said obstruction layer is in said presentation position, and wherein displacement of the obstruction layer from said presentation position renders the machine readable activation field non-readable.

4. A card presentation instrument according to claim 3, wherein said activation field comprises:
a bar code.

5. A card presentation instrument according to claim 3, wherein said machine readable activation field is provided so that a portion thereof remains on said activatable card after displacement of the obstruction layer to render said card data field readable.

6. A card presentation instrument according to claim 5, wherein said exposed data field is located in at least partially overlapping relation with respect to said card date field when the obstruction layer is in said presentation position.

7. A card presentation instrument according to claim 1, further comprising:
a support member that encloses at least a portion of said activatable card.

8. A card presentation instrument according to claim 7, wherein said support member comprises:
an aperture aligned with said exposed data field when said obstruction layer is in said presentation position.

9. A card presentation instrument according to claim 8, wherein said aperture comprises:
a substantially transparent layer located adjacent to said obstruction layer when in said presentation position.

10. A card presentation instrument according to claim 1, wherein said obstruction layer is in at least a partially overlapping relation with respect to said data field when in said presentation position.

11. A card presentation instrument according to claim 1, wherein said exposed activation data field is provided so that a portion thereof remains on said activatable card after displacement of the obstruction layer to render said card data field readable.

12. A card presentation instrument according to claim 1, wherein said exposed data field is an activation data field encoding activation information, and wherein the activation information is correletable to the account associated with the proprietary account data field to activate the activatable card.

13. A card presentation instrument according to claim 12, wherein said proprietary account data field is necessary to use the activatable card for value, and wherein said activatable card may be used for value in the amount of a balance of funds available to the account upon activation of the activatable card.

14. A card presentation instrument according to claim 13, wherein the activation information is correlated to the account by a card issuer.

15. A card presentation instrument according to claim 1, wherein said exposed data field is located in at least partially overlapping relation with respect to said card date field when the obstruction layer is in said presentation position.

16. A card presentation instrument having an exposed data field associated with an activatable card, comprising:
an activatable transaction card having a card data field disposed on a first side thereof, said card data field being uniquely associated with said activatable transaction card; and
an obstruction layer located in a presentation position relative to said activatable transaction card to render all or at least a portion of said card data field unreadable, said obstruction layer having at least a portion of said exposed data field associated with an activatable transaction card disposed on an outer surface thereof, said exposed data field being readable when the obstruction layer is in said presentation position, and wherein said exposed data field is located in at least partially overlapping relation with respect to said card data field when the obstruction layer is in said presentation position.

17. A card presentation instrument according to claim 16, wherein said obstruction layer is disposed in contact with said activatable card in said presentation position.

18. A card presentation instrument according to claim 16, wherein said exposed data field comprises a machine readable activation field having an exposed data field associated with an activatable card when the obstruction layer is in said presentation position.

19. A card presentation instrument according to claim 18, wherein said activation field comprises:
a bar code.

20. A card presentation instrument according to claim 19, wherein said card data field comprise:
a proprietary account data field.

21. A card presentation instrument according to claim 18, wherein said machine readable activation field is provided so that a portion thereof remains on said activatable card after displacement of the obstruction layer to render said card data field readable.

22. A card presentation instrument according to claim 16, further comprising:
a support member that encloses at least a portion of said activatable card.

23. A card presentation instrument according to claim 22, wherein said support member comprises:
an aperture aligned with said exposed data field when said obstruction layer is in said presentation position.

24. A card presentation instrument according to claim 23, wherein said aperture comprises:
a substantially transparent layer located adjacent to said obstruction layer when in said presentation position.

25. A card presentation instrument according to claim 24, wherein said obstruction layer is displaceable from said presentation position to render said card data field readable and said exposed data field unreadable.

26. A card presentation instrument according to claim 16, wherein said exposed activation data field is provided so that a portion thereof remains on said activatable card after displacement of the obstruction layer to render said card data field readable.

27. A card presentation instrument according to claim 16, wherein said activation field comprises:
a proprietary account data field associatable with an account corresponding to the activatable transaction card.

28. A card presentation instrument according to claim 27, wherein said account is associatable to a value.

* * * * *